(12) United States Patent
Hara et al.

(10) Patent No.: US 7,531,995 B2
(45) Date of Patent: May 12, 2009

(54) ELECTRONIC DEVICE

(75) Inventors: Yasushi Hara, Kawasaki (JP); Akira Shiba, Kawasaki (JP); Yukihisa Taike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 11/893,214

(22) Filed: Aug. 15, 2007

(65) Prior Publication Data

US 2008/0054862 A1 Mar. 6, 2008

(30) Foreign Application Priority Data

Aug. 30, 2006 (JP) ............................. 2006-233276

(51) Int. Cl.
*G05F 1/563* (2006.01)
*G05F 1/565* (2006.01)

(52) U.S. Cl. .................. 323/281; 323/274; 323/349

(58) Field of Classification Search ............... 323/226, 323/265, 266, 269, 270, 273, 274, 275, 279, 323/281, 349
See application file for complete search history.

(56) References Cited

U.S. PATENT DOCUMENTS

| | | | |
|---|---|---|---|
| 6,969,981 B1 * | 11/2005 | Fairbanks et al. | 323/299 |
| RE39,374 E * | 11/2006 | Manabe et al. | 323/274 |
| 7,135,842 B2 * | 11/2006 | Banerjee et al. | 323/275 |
| 7,385,376 B2 * | 6/2008 | Zolfaghari | 323/266 |

FOREIGN PATENT DOCUMENTS

| | | |
|---|---|---|
| JP | 07-095765 | 4/1995 |
| JP | 11-041825 | 2/1999 |
| JP | 2003-009515 | 1/2003 |

OTHER PUBLICATIONS

Texas Instruments Japan Ltd. (2006); "Power-Supply IC Cookbook for Low Voltage Era"; Apr. 15, 2006, pp. 11-13; CQ Publishing Co., Ltd.

* cited by examiner

*Primary Examiner*—Gary L Laxton
(74) *Attorney, Agent, or Firm*—Greer, Burns & Crain, Ltd.

(57) ABSTRACT

An electronic device includes: a DC power source which supplies a first DC supply voltage; a DC voltage converter which is enabled or disabled in response to a first control signal, and which converts the first DC supply voltage into a second DC supply voltage different from the first DC supply voltage, when the DC voltage converter is enabled; a switch which selects and supplies either the first DC supply voltage or the second DC supply voltage as an output in response to a second control signal; a DC voltage regulator which is enabled or disabled in response to a third control signal, and which converts the DC supply voltage selected by the switch into a third supply voltage lower than the selected DC supply voltage when said DC voltage regulator is enabled; a control unit which provides the second control signal to the switch; and a loading which utilizes the third DC supply voltage. While the loading is operating intermittently, the control unit provides to the DC voltage converter the first control signal for disabling the DC voltage converter, provides to the switch the second control signal for selecting the first DC supply voltage, and provides to the DC voltage regulator the third control signal for enabling the DC voltage regulator.

20 Claims, 9 Drawing Sheets

CONFIGURATION OF
DC VOLTAGE CONV. & REG.,
WHEN SWITCH IS PLACED IN INPUT 1
CONFIGURATION OF
DC VOLTAGE CONV. & REG.,
WHEN SWITCH IS PLACED IN INPUT 0
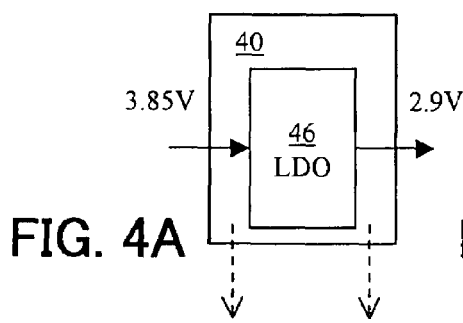
FIG. 4A
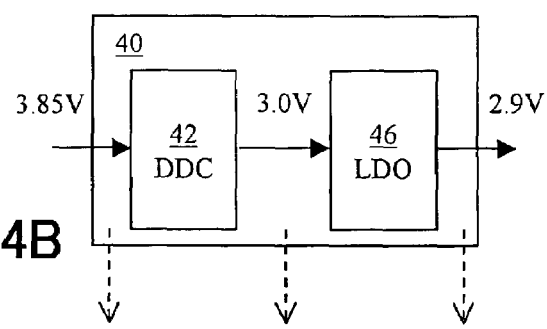
FIG. 4B
COMPARISON OF SUPPLY POWERS
FIG. 4C
COMPARISON OF SUPPLY POWERS
FIG. 4D

ELECTRONIC DEVICE

FIELD OF THE INVENTION

The present invention relates generally to an electronic device having a DC voltage converting function, and more particularly to an electronic device including a DC voltage conversion circuit which efficiently converts one DC source voltage into desired DC supply voltages.

BACKGROUND OF THE INVENTION

In a mobile electronic device such as a mobile or cellular telephone for example, there is a need for improvement of the efficiency of an electric power supply for a longer battery run time.

In Japanese Patent Application Publication JP H 11-41825-A published on Feb. 12, 19999, Matsumura describes a power supply switching device for switching power supplies in accordance with a load consumption power. The power supply switching device has a battery provided in a mobile device, and has at least one constant voltage means. The power supply switching device includes a DC voltage conversion means for developing a DC voltage lower than the battery voltage, switching means for switching between the battery voltage and the DC voltage developed by the DC voltage conversion means to provide a power to the input of the constant voltage means, and control means for controlling the switching means to select the DC voltage developed by the DC voltage conversion means in a main drive state with large power consumption and to select the battery voltage in a standby state with small power consumption.

In Japanese Patent Application Publication JP H 7-95765-A published on Apr. 7, 1995, Ishikawa describes a stabilized DC power supply device. In the stabilized DC power supply device, a series regulator is connected to an output of a chopper regulator for integration. Thereby, the stabilized DC power supply has a small size, reduces noise and a ripple, and has high efficiency and high output voltage accuracy. It requires a small number of external parts and small space, and can be easily designed.

In Japanese Patent Application Publication JP 2003-9515-A, Eguchi describes a power supply system. In a device using a battery as a power supply, such as a PDA, a mobile telephone and the like, a low dropout regulator and a DC/DC converter are used by switching them in accordance with a load current of the device to thereby convert the voltage at the high efficiency. For switching between the low dropout regulator and the DC/DC converter, the DC/DC converter is caused to operate asynchronously, and the low dropout regulator and the DC/DC converter are caused to operate simultaneously, whereby the voltage ripple in the switching operation is reduced and a power supply with a stable output voltage is provided. This provides the stable power supply output having the low ripple and high conversion efficiency even in the operation of the device with a low load current, while keeping high conversion efficiency.

The DC voltage conversion efficiency of a DC-DC (DDC) converter and an LDO regulator are described in Texas Instruments Japan Ltd., "Power-Supply IC Cookbook for Low Voltage Era", Apr. 15, 2006, pages 11-13, CQ Publishing CO., Ltd.

SUMMARY OF THE INVENTION

In accordance with one aspect of the present invention, an electronic device includes: a DC power source which supplies a first DC supply voltage; a DC voltage converter which is enabled or disabled in response to a first control signal, and which converts the first DC supply voltage into a second DC supply voltage when the DC voltage converter is enabled, where the second DC supply voltage is different from the first DC supply voltage; a switch which selects and supplies either the first DC supply voltage or the second DC supply voltage as an output in response to a second control signal; a DC voltage regulator which is enabled or disabled in response to a third control signal, and which converts the DC supply voltage selected by the switch into a third supply voltage when said DC voltage regulator is enabled, where the third supply voltage is lower than the selected DC supply voltage; a control unit which provides the second control signal to the switch; and a loading which utilizes the third DC supply voltage. While the loading is operating intermittently, the control unit provides, to the DC voltage converter, the first control signal for disabling the DC voltage converter, provides, to the switch, the second control signal for selecting the first DC supply voltage, and provides, to the DC voltage regulator, the third control signal for enabling the DC voltage regulator.

In accordance with another aspect of the invention, the electronic device further includes a voltage detector which detects the first DC supply voltage of the DC power source. When the value of the first DC supply voltage detected by the voltage detector is not higher than a first predetermined threshold value which is higher by a predetermined value than a predetermined output voltage of the DC voltage regulator, the control unit, independently of the operation state of the loading, provides to the switch the second control signal for selecting the first DC supply voltage.

BRIEF DESCRIPTION OF THE DRAWINGS

FIG. 1 shows a schematic configuration of an electronic device to which the present invention can be applied to;

FIG. 4A shows the configuration of the DC voltage conversion and regulation unit for generating a desired supply voltage and desired electric power when the switch is placed in the INPUT 1 position, FIG. 4B shows the configuration of the DC voltage conversion and regulation unit for generating the desired supply voltage and the desired electric power when the switch is placed in the INPUT 0 position, FIG. 4C shows power conversion efficiency in the voltage conversion through the voltage regulation by the LDO regulator in the configuration of FIG. 4A, and FIG. 4D shows power conversion efficiency in the voltage conversion through the voltage conversion and regulation by both of the DDC converter and the connected LDO regulator in the series connection in the configuration of FIG. 4B;

DESCRIPTION OF THE PREFERRED EMBODIMENTS

Figure 1:
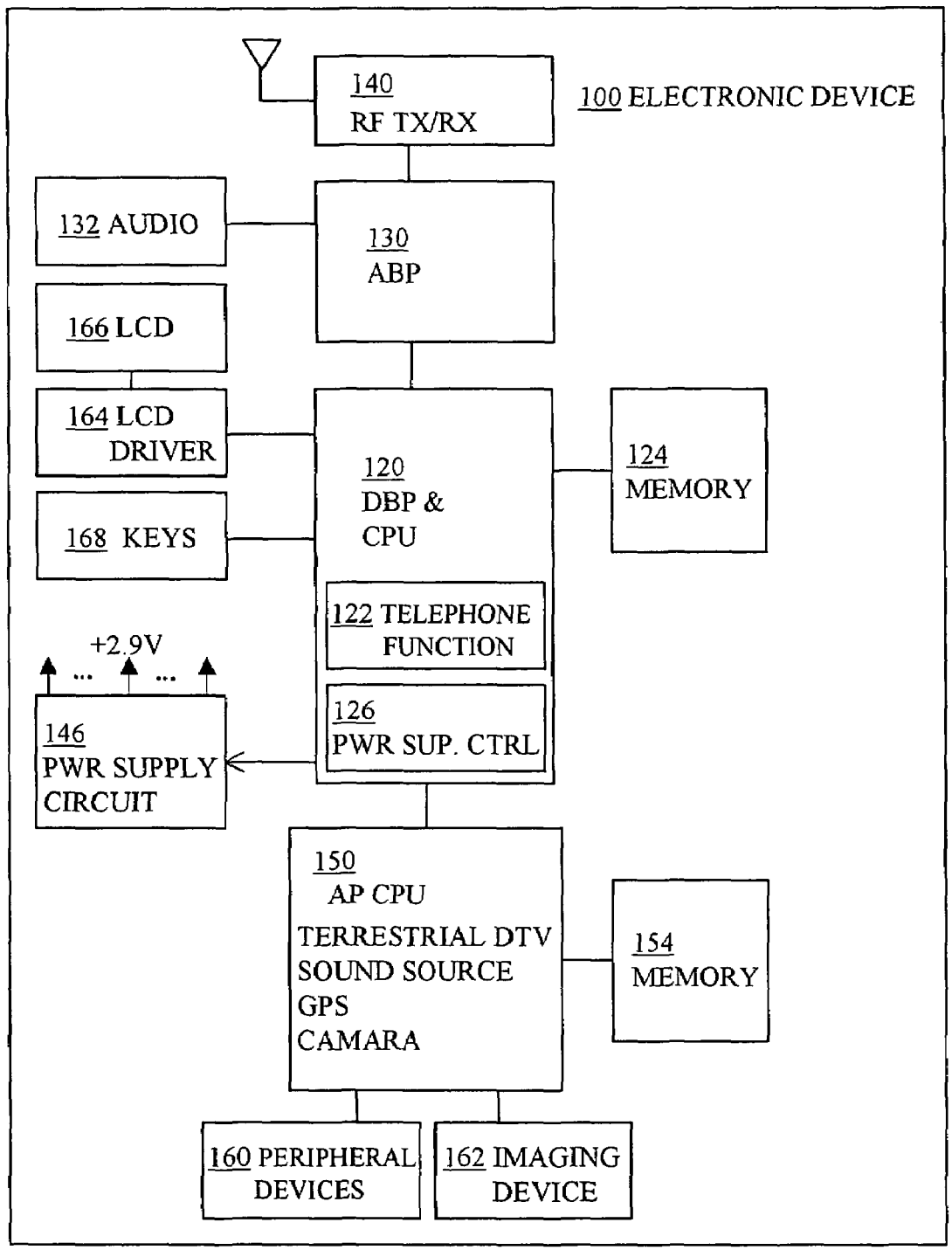

As described in the publication JP H 7-95765-A, for reducing power loss in an electric power supply which employs an LDO regulator (series regulator), generally, a DDC converter (switching regulator) converts the DC supply voltage to a DC voltage near a desired voltage, and the output of the converted voltage from the DDC converter is then coupled to the input of the LDO regulator to thereby develop the desired converted voltage. When the DDC converter and the LDO regulator are used in combination in a mobile telephone, a substantially constant electric current is dissipated by an RF unit thereof related to the telephone voice communication occurring while the mobile telephone is off the hook. This reduces the voltage conversion power loss significantly, as opposed to the voltage conversion by the LDO regulator alone.

Generally, while the mobile telephone is operating to await an incoming call, its LDO regulator is disabled or turned off to reduce the standby electric power consumption, and the LDO regulator is enabled or turned on only for communication with an access point, occurring in a cycle of 2.56 seconds (approximately 2.5 seconds) for example, and then is disabled immediately after the communication is completed. In the communication with the access point, if both of the DDC converter and the LDO regulator are disabled during the incoming call awaiting, and are enabled only for the communication with the access point, then the DDC converter cannot operate so as to quickly follow the communication with the access point due to the slow start-up of the DDC converter. Thus the DDC converter is required to be enabled permanently. If the DDC converter is enabled permanently, however, it consumes the electric power as much as about 0.3 mW as a part of the standby electric power consumption, which accounts for about 10% of the entire standby electric power consumption of about 3 mW. Thus the battery run time of the mobile telephone may be shortened.

The inventors have recognized that the DC voltage conversion through both of a DDC converter and an LDO regulator during the incoming call awaiting operation of a mobile telephone consumes larger electric power than the DC voltage conversion through the LDO regulator alone, and hence the electric power loss is increased. Thus, the DC voltage conversion in such a mobile telephone done through both of the DDC converter and the LDO regulator reduces the electric power loss in the continuous operation of the RF unit for the operation such as the telephone voice communication for example, but raises the electric power loss in the intermittent operation of the RF unit for the operation such as the incoming call awaiting for example.

An object of the present invention is to improve the efficiency of DC voltage conversion in an electronic device.

Another object of the invention is to reduce power consumption at a standby or intermittent mode of operation in an electronic device.

A further object of the invention is to allow a battery power source to run even at a lower reduced output voltage.

According to the invention, the efficiency of DC voltage conversion in an electronic device can be improved, power consumption at a standby or intermittent mode of operation in an electronic device can be reduced, and a battery power source can run at a lower reduced output voltage.

The invention will be described in connection with non-limiting embodiments with reference to the accompanying drawings. Throughout the drawings, similar symbols and numerals indicate similar items and functions.

FIG. 1 shows a schematic configuration of an electronic device 100 to which the present invention can be applied to. The electronic device 100 may be a mobile or cellular telephone, or a PDA (Personal Digital Assistant) or a notebook personal computer (PC) having a telephone function. The electronic device 100 includes a digital baseband processing unit (DBP) and CPU 120, an analogue baseband processing unit (ABP) 130, a wireless transceiver (RF TX/RX) 140, an application CPU (AP CPU) 150 as a hardware application unit, a memory 124, a memory 154, and a power supply circuit 146. An audio unit 132 including a speaker, a receiver and a microphone is coupled to the ABP 130. Keys 168 and an LCD driver 164 coupled to an LCD 166 are coupled to the DBP and CPU 120. Peripheral devices 160 and an imaging device 162 are coupled to the application CPU (AP CPU) 150. The DBP and CPU 120 operates in accordance with applications stored in the memory 124. A power supply control unit 126 is implemented on the DBP and CPU 120 in the form of hardware or software. A telephone function 122 is implemented as an application on the DBP and CPU 120 in the form of hardware or software. The DBP and CPU 120 and the application CPU 150 may be integrated into a single integrated circuit. The telephone function 122 performs the intermittent incoming call awaiting operation, and the voice communication operation associated with the call origination and call termination.

Figure 2A:
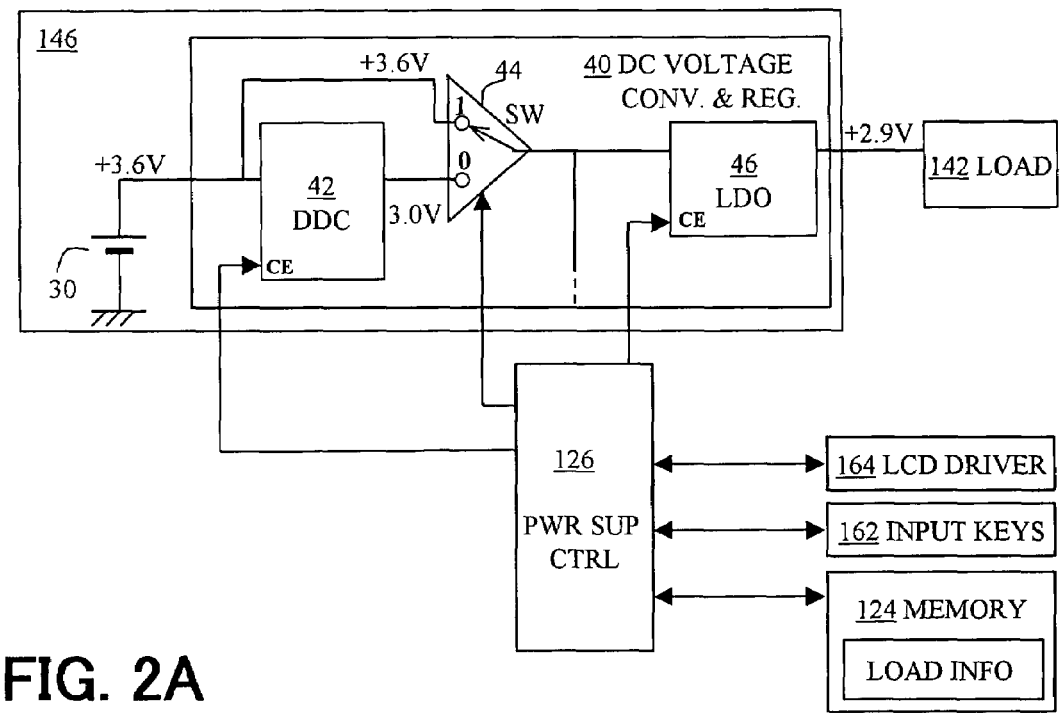
FIG. 2A illustrates a circuit configuration of the DC voltage conversion and regulation unit in the power supply circuit, for a load, and of the power supply control unit for controlling the DC voltage conversion and regulation unit, in accordance with an embodiment of the invention.

FIG. 2A illustrates a circuit configuration of the DC voltage conversion and regulation unit 40 in the power supply circuit 146, for a load 142, and of the power supply control unit 126 for controlling the DC voltage conversion and regulation unit 40, in accordance with an embodiment of the invention. The DC voltage conversion and regulation unit 40 includes a DDC converter (DC-DC voltage converter) 42 as a DC voltage converter that has an input coupled to a DC rechargeable battery 30 with the nominal output voltage of +3.6 V for example, a switch (SW) 44 that has two input terminals (INPUTS 0 and 1) coupled to the DC rechargeable battery 30 and to the DDC converter 42, and a LDO (Low Dropout Voltage) regulator 46 as a DC voltage regulator that has an input coupled to the output of the switch 44 and an output coupled to the load 142. The power supply control unit 126 provides, to the controlled end terminals (CE) of the DDC converter 42 and the LDO regulator 46, a control signal for controlling the enable/disable of the DDC converter 42 and the LDO regulator 46, and provides, to a controlled end terminal of the switch 44, a control signal for controlling the input position (INPUT 0 or 1) of the switch 44 to be placed in. When the switch 44 is placed in the INPUT 0 position, the switch 44 couples the output voltage of the DDC converter 42 to the input of the LDO regulator 46. When the switch 44 is placed in the INPUT 1 position, the switch 44 couples the output voltage of the DC rechargeable battery 30 to the input of the LDO regulator 46. The power supply control unit 126 is connected to the LCD driver 164, the input keys 162 and the memory 124. The memory 124 stores loading information which indicates the relationship between operation states or modes of respective applications and operation states or modes of loads corresponding to the applications.

Figure 2B:
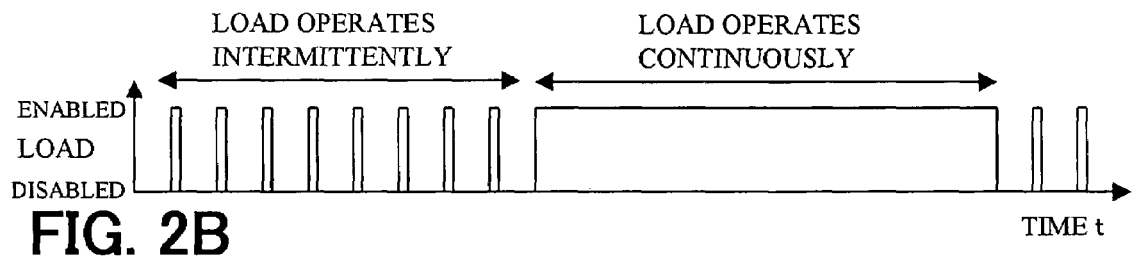
FIG. 2B shows operation states of the load coupled to the output of the DC voltage conversion and regulation unit.
Figure 2C:
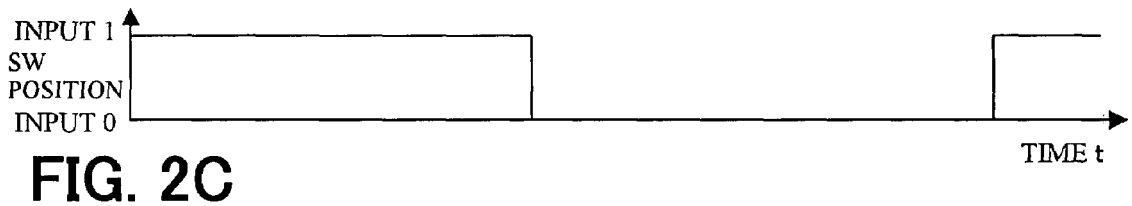
FIG. 2C shows the input position of the switch that is controlled by the power supply control unit in accordance with the operation state of the load.

FIG. 2B shows operation states of the load 142 coupled to the output of the DC voltage conversion and regulation unit 40. FIG. 2C shows the input position (INPUT 0 or 1) of the switch 44 that is controlled by the power supply control unit 126 in accordance with the operation state of the load 142.

The load 142 takes either an intermittent operation state or a continuous operation state. The load 142 may be, for example, the wireless transceiver 140 of FIG. 1. In this case, the wireless transceiver 140 takes a state of awaiting an incoming call as the intermittent operation in accordance with the application for the call awaiting operation of the telephone function 122, and takes a state of the continuous telephone voice communication in association with the application for the call origination and termination operations of the telephone function 122. The power supply control unit 126 looks into the loading information in the memory 124 to check the operation state of the load 142 corresponding to the applications. When the operation state of the wireless transceiver 140, as the load 142, is in the intermittent operation state corresponding to the application for the incoming call awaiting operation, the power supply control unit 126 places the switch 44 in the INPUT 1 position, to thereby couple the output voltage of the DC rechargeable battery 30 to the input of the LDO regulator 46. On the other hand, when the operation state of the wireless transceiver 140, as the load 142, is in the continuous operation state corresponding to the application for the telephone voice communication operation, the power supply control unit 126 places the switch 44 in the INPUT 0 position, to thereby couple the output voltage of the DDC converter 42 to the input of the LDO regulator 46.

Figure 3A:
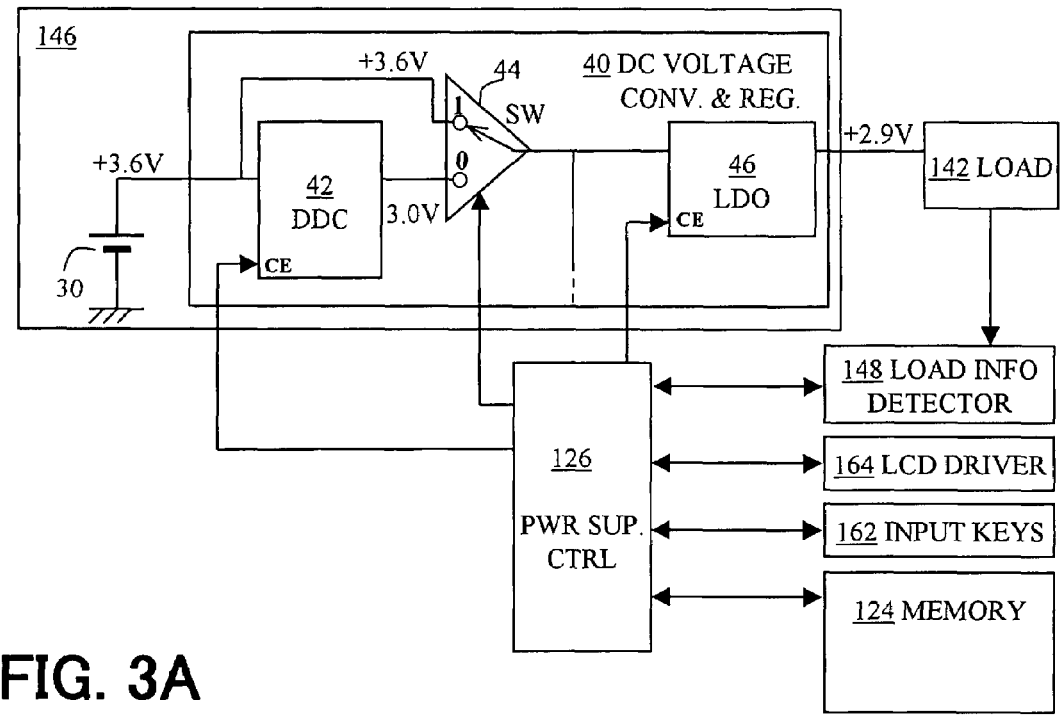
FIG. 3A illustrates another circuit configuration of the DC voltage conversion and regulation unit in the power supply circuit for a load, and of the power supply control unit for controlling the DC voltage conversion and regulation unit, in accordance with another embodiment of the invention.

FIG. 3A illustrates another circuit configuration of the DC voltage conversion and regulation unit 40 in the power supply circuit 146 for a load 142, and of the power supply control unit 126 for controlling the DC voltage conversion and regulation unit 40, in accordance with another embodiment of the invention. The configuration of the DC voltage conversion and regulation unit 40 is similar to that of the one shown in FIG. 2A. In this case, the power supply control unit 126 is connected to a loading information detector unit 148, the LCD driver 164, the input keys 162 and the memory 124. The load 142 takes either the intermittent operation state or the continuous operation state, similarly to that shown in FIGS. 2A and 2B.

The loading information detector unit 148 detects the present operation state of the load 142 coupled to the output of the DC voltage conversion and regulation unit 40, or detects the frequency of occurrences of data transmission and reception per unit time of the load 142, and provides information indicative of the detected operation state, i.e., either the intermittent operation state or the continuous operation state, to the power supply control unit 126. For example, the loading information detector unit 148 detects the present operation state of the load 142 coupled to the output of the DC voltage conversion and regulation unit 40 by counting the number of occurrences of data transmission and reception (e.g., the number of packets) per unit time. When the loading information detector unit 148 detects a continuous state of no communication, i.e. neither transmission nor reception, for about one second, it determines that the present operation state is the intermittent operation state, and provides the determined information to the power supply control unit 126.

Figure 3B:
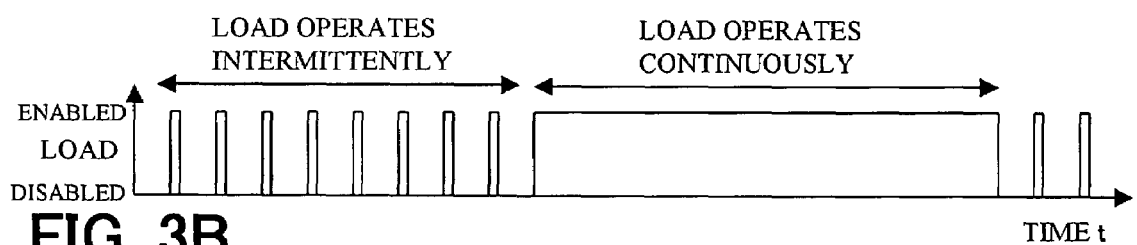
FIG. 3B shows operation states of the load coupled to the DC voltage conversion and regulation unit.
Figure 3C:
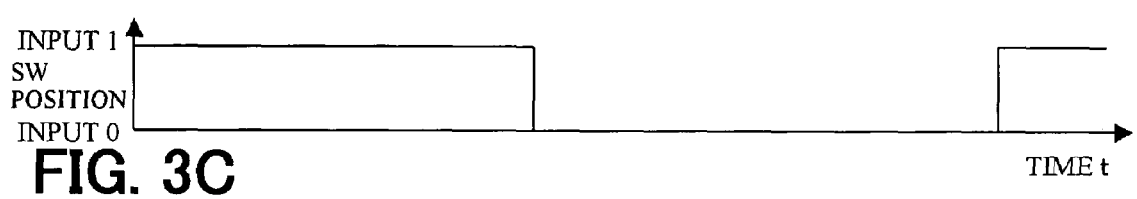
FIG. 3C shows the input position of the switch that is controlled by the power supply control unit in accordance with the operation state of the load.

FIG. 3B is similar to FIG. 2B, and shows operation states of the load 142 coupled to the DC voltage conversion and regulation unit 40. FIG. 3C is similar to FIG. 2C, and shows the input position (INPUT 0 or 1) of the switch 44 that is controlled by the power supply control unit 126 in accordance with the operation state of the load 142.

The power supply control unit 126 checks the information indicative of the present operation state of the load 142 that has been received from the loading information detector unit 148. When the present operation state of the wireless transceiver 140, as the load 142, is in the intermittent operation state, the power supply control unit 126 places the switch 44 in the INPUT 1 position, to thereby couple the output voltage of the DC rechargeable battery 30 to the input of the LDO regulator 46. On the other hand, when the present operation state of the wireless transceiver 140, as the load 142, is in the continuous operation state, the power supply control unit 126 places the switch 44 in the INPUT 0 position, to thereby couple the output voltage of the DDC converter 42 to the input of the LDO regulator 46.

FIG. 4A shows the configuration of the DC voltage conversion and regulation unit 40 for generating a desired supply voltage, e.g. +2.9 V, and desired electric power when the switch 44 is placed in the INPUT 1 position. FIG. 4B shows the configuration of the DC voltage conversion and regulation unit 40 for generating the desired supply voltage, e.g. +2.9 V, and the desired electric power when the switch 44 is placed in the INPUT 0 position. FIG. 4C shows power conversion efficiency in the voltage conversion through the voltage regulation by the LDO regulator 46 in the configuration of FIG. 4A. FIG. 4D shows power conversion efficiency in the voltage conversion through the voltage conversion and regulation by both of the DDC converter 42 and the connected LDO regulator 46 in the series connection in the configuration of FIG. 4B.

In comparison between the power conversion efficiencies in the respective voltage conversions of FIGS. 4C and 4D, the power conversion efficiency through the voltage conversion and regulation by the DDC converter 42 and the LDO regulator 46 in the series connection of FIG. 4D is higher than the power conversion efficiency through the LDO regulator 46 alone of FIG. 4C, and the power loss of the LDO regulator 46 is higher than the sum of the power losses of the DDC converter 42 and the LDO regulator 46 in the series connection. However, the DDC converter 42 has a longer start-up time, and hence must be perpetually in the enabled state when the DDC converter 42 is employed together with the LDO regulator 46.

Figure 5:
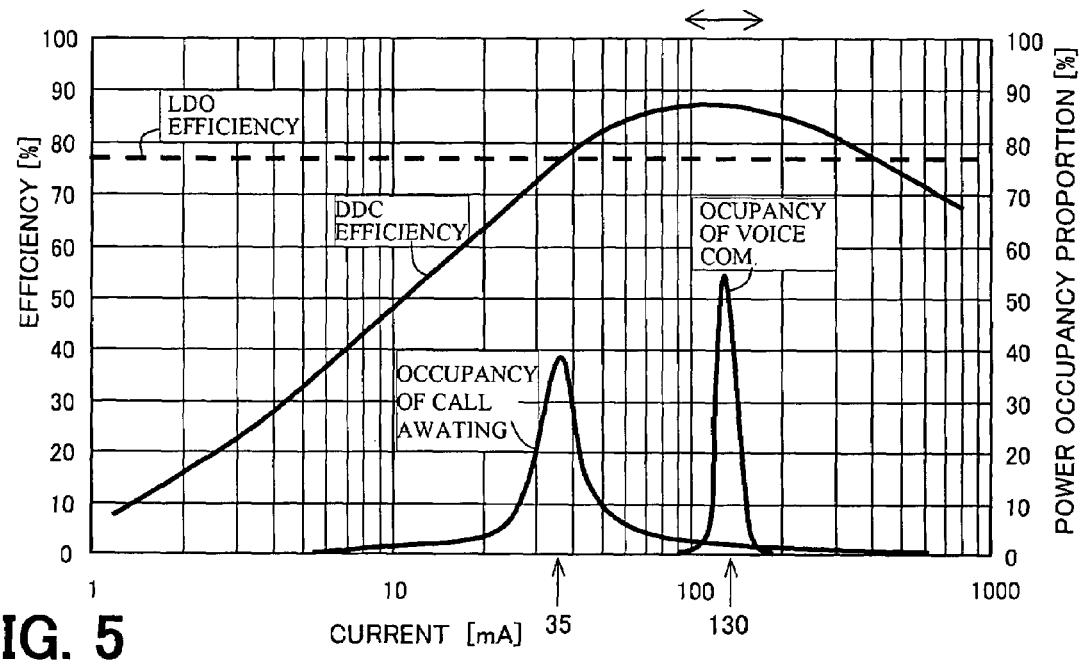
FIG. 5 shows the power conversion efficiencies (%) of the DDC converter and the LDO regulator, relative to their respective consumption currents, and the curves of consumption current occupancy proportions of the incoming call awaiting state and the telephone voice communication state, respectively, in the entire consumption current, relative to their respective consumption currents.

FIG. 5 shows the power conversion efficiencies (%) of the DDC converter 42 and the LDO regulator 46, relative to their respective consumption currents, and the curves of consumption current occupancy proportions or ratios (%) of the incoming call awaiting state and the telephone voice communication state, respectively, in the entire consumption current, relative to the their respective consumption currents. From FIG. 5, it is seen that the efficiency of the LDO regulator 46 is constant independently of the current variations, that the efficiency of the DDC converter 42 has a peak between 100 mA and 150 mA, that the efficiency of the DDC converter 42 is higher than the efficiency of the LDO regulator 46 around the peak of the curve of the consumption current occupancy proportion in the telephone voice communication state, and that the efficiency of the DDC converter 42 is approximately the same as the efficiency of the LDO regulator 46 near the peak of the curve of consumption current occupancy proportion in the incoming call awaiting state.

Figure 6A:
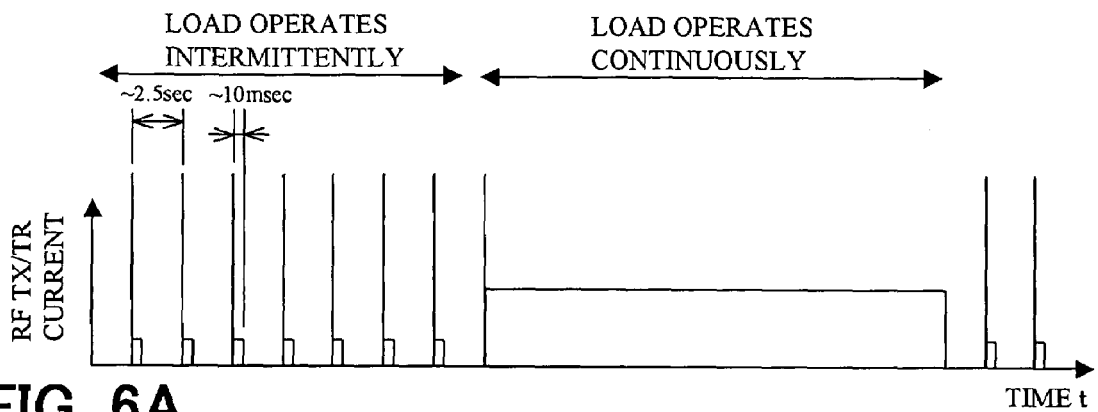
FIG. 6A shows the consumption current of the RF transceiver as the load operating in the intermittent mode of operation and the continuous mode of operation.
Figures 6B, 6C:
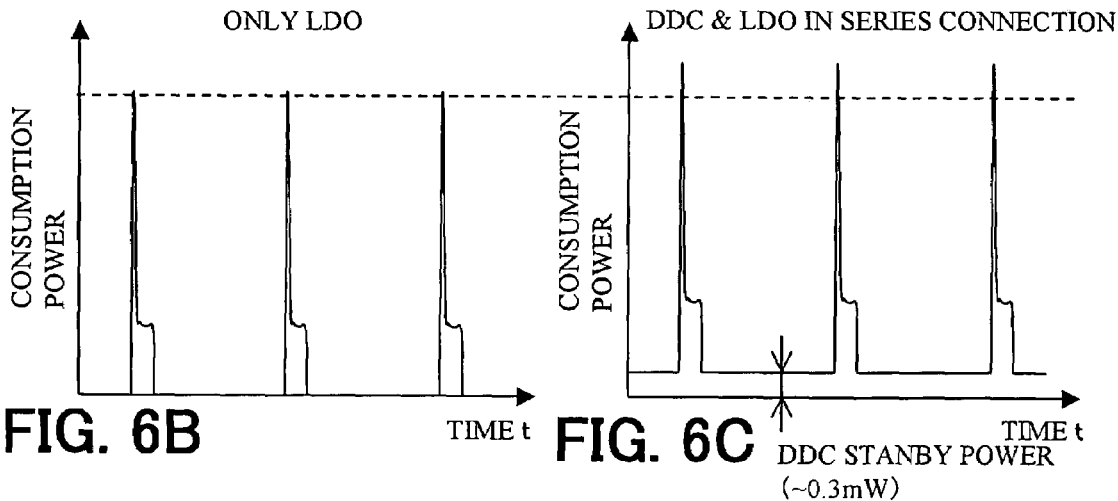
FIG. 6B shows the input consumption power of the LDO regulator of FIG. 4A, when the wireless transceiver is in the intermittent mode of operation.
FIG. 6C shows the input consumption power of the DDC converter and the LDO regulator in the series connection of FIG. 4B, when the wireless transceiver is in the intermittent mode of operation.

FIG. 6A shows the consumption current of the RF transceiver 140 as the load 142 operating in the intermittent mode of operation and in the continuous mode of operation. FIG. 6B shows the input consumption power of the LDO regulator 46 of FIG. 4A, when the wireless transceiver is in the intermittent mode of operation. FIG. 6C shows the input consumption power of the DDC converter 42 and the LDO regulator 46 in the series connection of FIG. 4B, when the wireless transceiver is in the intermittent mode of operation. From FIG. 6C, it is seen that, while the wireless transceiver 140 is in the intermittent operation state, the DDC converter 42 connected in series to the LDO regulator 46 of FIG. 4B constantly consumes about 0.3 mW as the standby power of the DDC converter 42. From FIGS. 6B and 6C, it is seen that the LDO regulator 46 consumes electric power only during each of the intermittent enabled operations, and exhibits lower consumption power during each of the intermittent enabled operations and hence in the entire period of time.

Thus the power conversion efficiency in the voltage conversion and regulation in the intermittent operation state of the load 142 can be improved by the circuit configuration of the DC voltage conversion and regulation unit 40 shown in FIGS. 2A and 3A, and by allowing the switch 44 to be controlled by the power supply control unit 126 shown in FIGS. 2C and 3C.

Figure 7A:
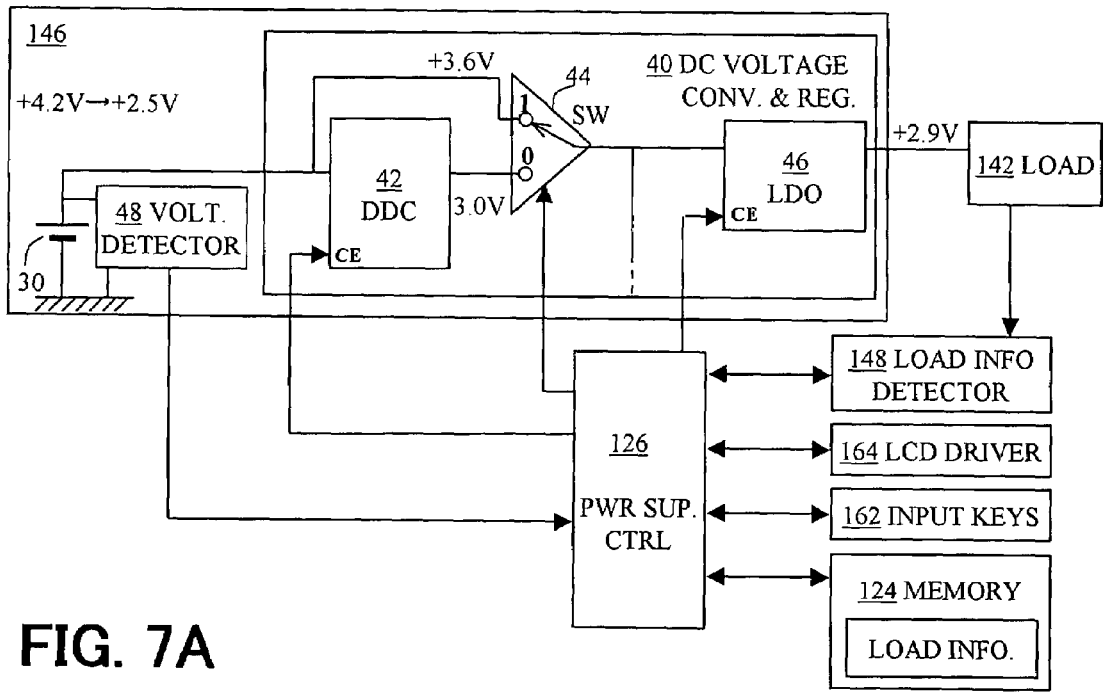
FIG. 7A illustrates a further circuit configuration of the DC voltage conversion and regulation unit in the power supply circuit for a load, and of the power supply control unit for controlling the DC voltage conversion and regulation unit, in accordance with a further embodiment of the invention.

FIG. 7A illustrates a further circuit configuration of the DC voltage conversion and regulation unit 40 in the power supply circuit 146 for a load 142, and of the power supply control unit 126 for controlling the DC voltage conversion and regulation unit 40, in accordance with a further embodiment of the invention. In this case, a voltage detector unit 48 for detecting the present voltage of the DC rechargeable battery 30 is connected to the DC rechargeable battery 30. The voltage detector unit 48 provides the detected voltage value Vbt of the DC rechargeable battery 30 to the power supply control unit 126. The other configuration and connections of the DC voltage conversion and regulation unit 40 and the power supply control unit 126 are similar to those of FIGS. 2A-2C and 3A-3C. The DC rechargeable battery 30 is used from its initial maximum voltage +4.2 V down to its ultimate minimum voltage +2.5 V. In this case, the DDC converter 42 is a step-up and step-down converter that has a function of stepping up and down the input voltage. When the detected voltage value of the DC rechargeable battery 30 is higher than a first predetermined threshold voltage value V1, the power supply control unit 126 operates in the same manner as the embodiment of FIGS. 2A-2C or 3A-3C. In this case, the power supply control unit 126 may determine the present operation state of the load 142 which corresponds to an application, in accordance with the loading information stored in the memory 124, or may determine the present operation state of the load 142 in accordance with information received from the loading information detector unit 148, to thereby determine whether the present operation state of the load is the intermittent operation state or the continuous operation state.

On the other hand, when the detected voltage value of the DC rechargeable battery 30 falls to the first predetermined threshold voltage value V1 or lower, the power supply control unit 126, independently of the operation state of the load 142, places the switch 44 in the INPUT 1 position to thereby couple the output voltage of the DC rechargeable battery 30 to the input of the LDO regulator 46. The power conversion efficiency of the LDO regulator 46 can be calculated in accordance with the ratio of the output voltage to the input voltage. For example, for an input voltage of 3.85 V and an output voltage of 2.9 V, the power conversion efficiency of the LDO regulator 46 accounts for 2.9/3.85×100%=75.3%. On the other hand, the power conversion efficiency of the combination of the DDC converter 42 and the LDO regulator 46 is represented by "the power conversion efficiency of the DDC converter 42" multiplied by "the power conversion efficiency of the LDO regulator 46". In the case of the power conversion efficiency of the DDC converter 42 of 90%, in the configuration of FIG. 7A, where the input voltage of 3.85 V is converted by the DDC converter 42 to develop the intermediate voltage of 3.0 V, which is then converted by the LDO regulator 46 to develop the output voltage of 2.9 V, the entire power conversion efficiency is represented by 90%×2.9/3.0×100%=87%. According to this way of calculation, the power conversion efficiency of the combination of the DDC converter 42 and the LDO regulator 46 becomes lower than that of the LDO regulator alone, when the input voltage is reduced to 3.33 V or lower. Thus the first predetermined threshold voltage value V1 should be about 3.34 V. Thus it is desirable for the switch 44 to switch the configuration of the DC voltage conversion and regulation unit 40, from the combination of the DDC converter 42 and the LDO regulator 46 to the LDO regulator 46 alone.

When the detected voltage value of the DC rechargeable battery 30 is further reduced to a second predetermined threshold voltage value V2 or lower, the power supply control unit 126, independently of the operation state of the load 142, places the switch 44 in the INPUT 1 position to thereby couple the output voltage of the DC rechargeable battery 30 to the input of the LDO regulator 46. The second predetermined threshold voltage value V2 is the minimum input voltage, and depends on the performance of the LDO regulator 46 for the electric potential difference between the input and output voltages. In the configuration of FIG. 7A, the output voltage of the LDO regulator 46 is 2.9 V, and hence the second predetermined threshold voltage value V2 is preferably about 3.0 V, which is equal to the output voltage value of the DDC converter 42.

Figure 7B:
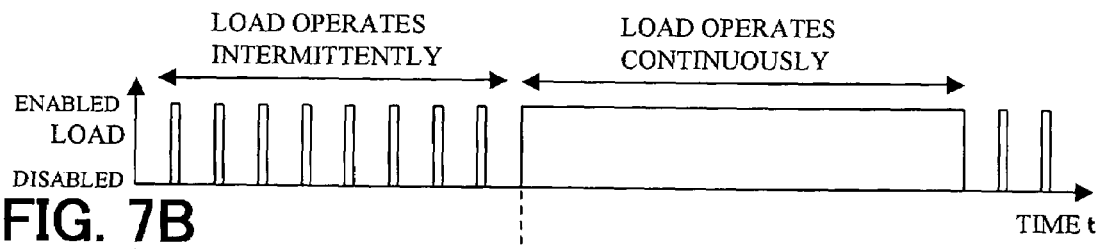
FIG. 7B shows operation states of the load coupled to the output of the DC voltage conversion and regulation unit.
Figure 7C:
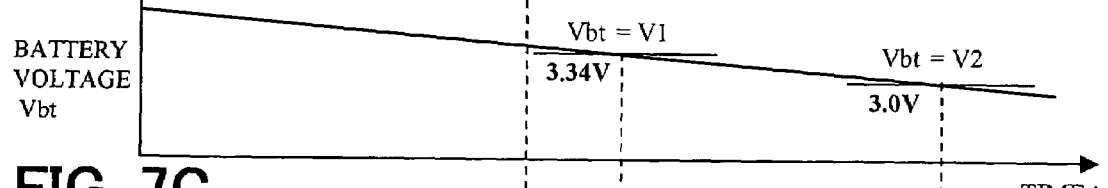
FIG. 7C shows an example of the voltage value of the DC rechargeable battery detected by the voltage detector unit that gradually reduces with elapse of the time.
Figure 7D:
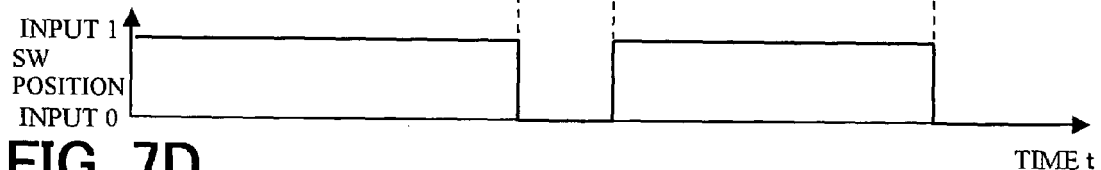
FIG. 7D shows the input position of the switch that is controlled by the power supply control unit in accordance with the operation state of the load and with the detected voltage value of the DC rechargeable battery.

FIG. 7B is similar to FIGS. 2B and 3B, and shows operation states of the load 142 coupled to the output of the DC voltage conversion and regulation unit 40. FIG. 7C shows an example of the voltage value of the DC rechargeable battery 30 detected by the voltage detector unit 48 that gradually decreases with elapse of the time. FIG. 7D shows the input position (INPUT 0 or 1) of the switch 44 that is controlled by the power supply control unit 126 in accordance with the operation state of the load 142 and with the detected voltage value of the DC rechargeable battery 30.

The initial supply voltage value Vbt of the DC rechargeable battery 30 detected by the voltage detector unit 48 is somewhat higher, e.g. +4.2 V, than a nominal voltage of +3.6 V, and gradually reduces with elapse of the time. Similarly to the embodiments of FIGS. 2A to 2C, in the period before the detected voltage value Vbt of the DC rechargeable battery 30 reduces to the first predetermined threshold voltage V1=3.22 V, the power supply control unit 126 places the switch 44 in the INPUT 1 position to thereby couple the output voltage of the DC rechargeable battery 30 to the input of the LDO regulator 46 while the load 142 is in the intermittent operation state, and couples the switch 44 in the INPUT 0 position to thereby couple the output voltage of the DDC converter 42 to the input of the LDO regulator 46 while the load 142 is in the continuous operation state.

During the period while the detected supply voltage value Vbt of the DC rechargeable battery 30 is further reduced and lies between the first predetermined threshold voltage V1=3.22 V and the second, lower predetermined threshold voltage V2=3.0 V, the power supply control unit 126, independently of the operation state of the load 142, places the switch 44 to the INPUT 1 position to thereby couple the output voltage of the DC rechargeable battery 30 to the input of the LDO regulator 46.

During the period while the detected supply voltage value Vbt of the DC rechargeable battery 30 is further reduced and lies between the second predetermined threshold voltage V2=3.0 V and an unusable voltage of, e.g. 2.4 V, the power supply control unit 126, independently of the operation state of the load 142, places the switch 44 in the INPUT 0 position to thereby couple the output voltage of the DDC converter 42 to the input of the LDO regulator 46.

Figure 8:
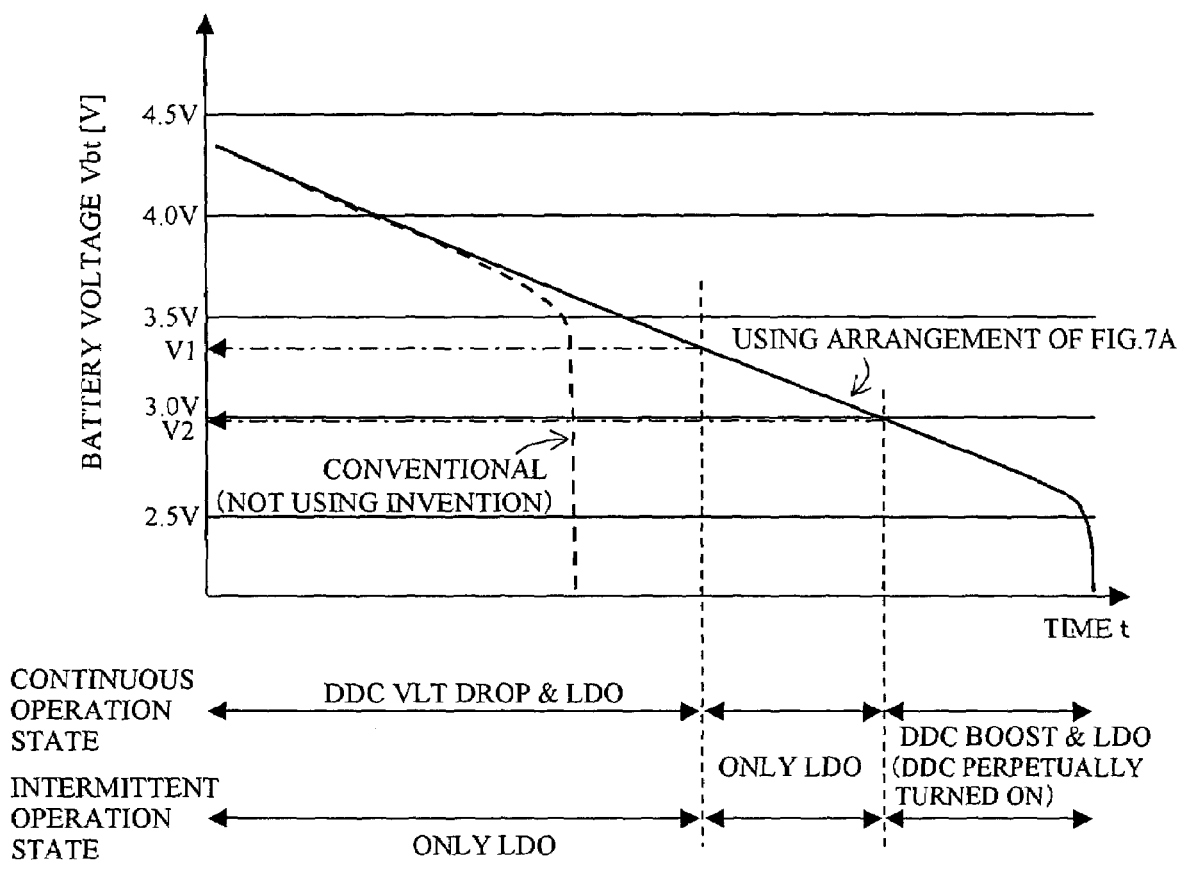
FIG. 8 shows the relationship of the voltage value of the DC rechargeable battery that gradually reduces with elapse of the time, in the configuration of the DC voltage conversion and regulation unit in accordance with the embodiment of FIG. 7A.

FIG. 8 shows the relationship of the voltage value Vbt of the DC rechargeable battery 30 that gradually reduces with elapse of the time, in the configuration of the DC voltage conversion and regulation unit 40 in accordance with the embodiment of FIG. 7A. In FIG. 8, a thick solid curve indicates the available range of the DC rechargeable battery 30 according to the embodiment of the present invention in FIG. 7A, and a thick dashed-line curve indicates the available range of the DC rechargeable battery 30 according to the configuration of the conventional technique.

The power conversion efficiency of the LDO regulator 46 is represented by the output voltage of the LDO regulator 46 divided by the input voltage of the LDO regulator 46. It is assumed that the voltage required for the load 142 is +2.9 V as an example, and that the power conversion efficiency of the DDC converter 42 is 90% as an example. In this case, when the voltage Vbt of the DC rechargeable battery 30 is reduced to V1=3.22 V or lower, the power conversion efficiency of the voltage conversion and regulation through the LDO regulator 46 alone becomes higher than that through the combination of DDC converter and the LDO regulator. When the voltage Vbt of the DC rechargeable battery 30 is further reduced to V2=3.0 V or lower, the LDO regulator 46 alone cannot maintain the output voltage of 2.9 V, and hence the DC conversion and regulation unit 40 stops its operation. Thus the DDC converter 42 may be used so as to operate in the step-up mode of operation, to thereby allow the LDO regulator 46 to operate further. Thus the DC rechargeable battery 30 can run, until its output voltage value Vbt is reduced to the unusable voltage of 2.4 V. Thus the battery run time of the DC rechargeable battery 30 can be extended longer.

Figure 9A:
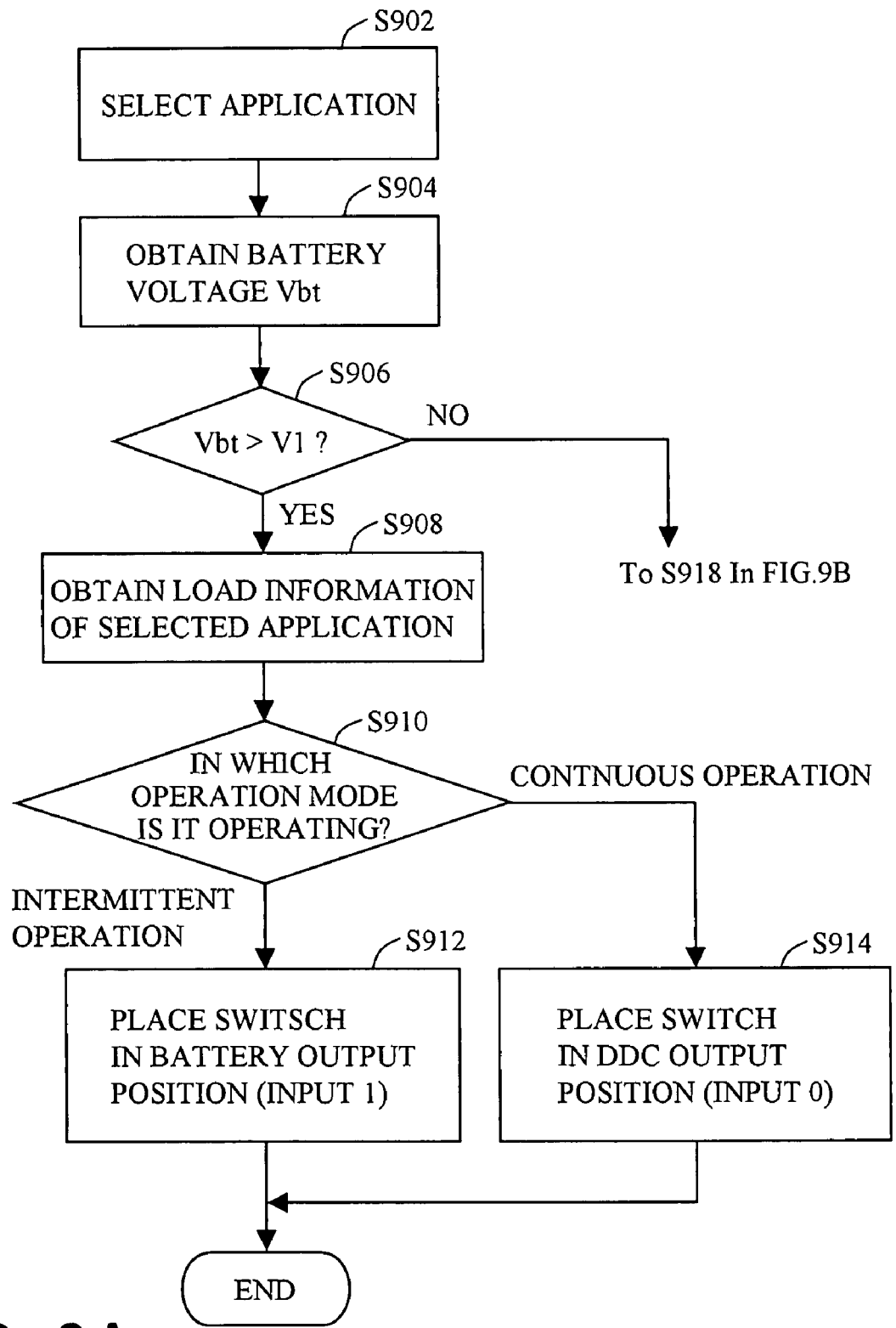
FIGS. 9A and 9B show a flow chart for controlling the switch by the power supply control unit in the embodiment of FIG. 7A.
Figure 9B:
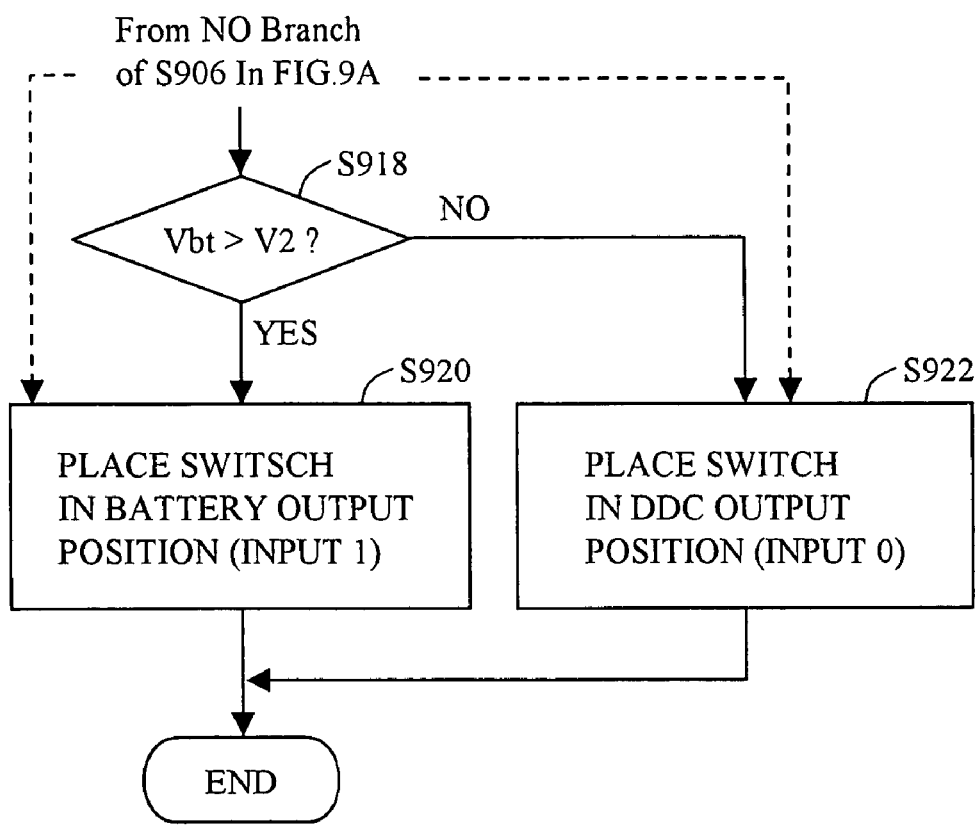

FIGS. 9A and 9B show a flow chart for controlling the switch 44 by the power supply control unit 126 in the embodiment of FIG. 7A.

At Step 902, the power supply control unit 126 selects an application to be activated in response to the operation of the electronic device by a user. At Step 904, the power supply control unit 126 obtains the detected supply voltage value Vbt of the DC rechargeable battery 30 from the voltage detector unit 48. At Step 906, the power supply control unit 126 determines whether the voltage value Vbt of the DC rechargeable battery 30 is higher than the first predetermined threshold voltage value V1. If it is determined that the voltage Vbt of the DC rechargeable battery 30 is not higher than the first predetermined threshold voltage value V1, the procedure proceeds to Step 918 in FIG. 9B.

If it is determined at Step 906 that the voltage value Vbt of the DC rechargeable battery 30 is higher than the second predetermined threshold voltage value V1, then the power supply control unit 126 at Step 908 obtains the loading information of the selected application from the memory 124, and determines a corresponding load 142. At Step 910, the power supply control unit 126 determines which mode of operation the load is operating in, the intermittent mode of operation or the continuous mode operation.

If it is determined that the operation mode of the load 142 is the intermittent operation mode, then at Step 912, the power supply control unit 126 provides, to the controlled end terminal of the switch 44, a control signal for placing the switch 44 in the INPUT 1 position for receiving the output voltage of the DC rechargeable battery 30. The power supply control unit 126 also provides, to the controlled end terminal (CE) of the DDC converter 42, a control signal for disabling the DDC converter 42. The power supply control unit 126 further provides, to the controlled end terminal of the LDO regulator 46, a control signal for enabling the LDO regulator 46. When the present position of the switch 44 is placed in the INPUT 0 position for receiving the output voltage of the DDC converter 42, the power supply control unit 126 switches the switch 44 to be placed in the INPUT 1 position for receiving the output voltage of the DC rechargeable battery 30. Otherwise, the power supply control unit 126 maintains the present position of the switch 44.

On the other hand, if it is determined that the mode of the load 142 is the continuous operation mode, then at Step 914, the power supply control unit 126 provides, to the controlled end terminal of the switch 44, a control signal for placing the switch 44 in the INPUT 0 position for receiving the output voltage of the DDC converter 42. The power supply control unit 126 also provides, to the controlled end terminal (CE) of the DDC converter 42, a control signal for enabling the DDC converter 42. The power supply control unit 126 further provides, to the controlled end terminal (CE) of the LDO regulator 46, a control signal for enabling the LDO regulator 46. When the present position of the switch 44 is placed in the INPUT 1 position for receiving the output voltage of the DC rechargeable battery 30, the power supply control unit 126 switches the switch 44 to be placed in the INPUT 0 position for receiving the output voltage of the DDC converter 42. Otherwise, the power supply control unit 126 maintains the present position of the switch 44.

Referring to FIG. 9B, at Step 918, the power supply control unit 126 determines whether the voltage value Vbt of the DC rechargeable battery 30 is higher than the second predetermined threshold voltage V2 (V2<V1).

If it is determined that the voltage Vbt of the DC rechargeable battery 30 is higher than the second predetermined threshold voltage value V2, then at Step 920, the power supply control unit 126 provides, to the controlled end terminal of the switch 44, a control signal for placing the switch 44 to the INPUT 1 position for receiving the output voltage of the DC rechargeable battery 30. The power supply control unit 126 also provides, to the controlled end terminal (CE) of the DDC converter 42, a control signal for disabling the DDC converter 42. The power supply control unit 126 further provides, to the controlled end terminal (CE) of the LDO regulator 46, a control signal for enabling the LDO regulator 46. When the present position of the switch 44 is placed in the INPUT 0 position for receiving the output voltage of the DDC converter 42, the power supply control unit 126 switches the switch 44 to be placed in the INPUT 1 position for receiving the output voltage of the DC rechargeable battery 30. Otherwise, the power supply control unit 126 maintains the present position of the switch 44.

On the other hand, if it is determined that the voltage Vbt of the DC rechargeable battery 30 is not higher than the second predetermined threshold voltage V2, then at Step 922, the power supply control unit 126 provides, to the controlled end terminal of the switch 44, a control signal for placing the switch 44 in the INPUT 0 position for receiving the output voltage of the DDC converter 42. The power supply control unit 126 also provides, to the controlled end terminal (CE) of the DDC converter 42, a control signal for enabling the DDC converter 42. The power supply control unit 126 further provides, to the controlled end terminal (CE) of the LDO regulator 46, a control signal for enabling the LDO regulator 46. When the present position of the switch 44 is placed in the INPUT 1 position for receiving the output voltage of the DC rechargeable battery 30, the power supply control unit 126 switches the switch 44 to be placed in the INPUT 0 position for receiving the output voltage of the DDC converter 42. Otherwise, the power supply control unit 126 maintains the present position of the switch 44.

Alternatively, after the NO branch from Step 906 in FIG. 9A, the procedure may proceeds directly to Step 920 in FIG. 9B, and Step 922 may not be executed. Thus the run time of the DC rechargeable battery 30 can be extended longer than the conventional way. Further alternatively, after the NO branch from Step 906 in FIG. 9A, the procedure may proceeds to Step 922 in FIG. 9B, even if the voltage Vbt of the DC rechargeable battery 30 is higher than the second predetermined threshold voltage V2 (V2<V1). Thus the run time of the DC rechargeable battery 30 can be extended longer than the conventional way, although the power conversion efficiency is somewhat lower.

As an application in the mobile telephone which operates in the intermittent operation state, a further application for transmitting data intermittently, such as an application for services of positioning with the GPS and of transmitting positioning information, may be employed in addition to the incoming call awaiting operation described above. As an application in the mobile telephone which operates in the continuous operation state, a further application for continuously transmitting or receiving data, such as an application for data communication services, may be employed in addition to the telephone voice communication operation described above.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An electronic device comprising:
 a DC power source which supplies a first DC supply voltage;
 a DC voltage converter which is enabled or disabled in response to a first control signal, and which converts the first DC supply voltage into a second DC supply voltage when said DC voltage converter is enabled, said second DC supply voltage being different from the first DC supply voltage;
 a switch which selects and supplies either the first DC supply voltage or the second DC supply voltage as an output in response to a second control signal;
 a DC voltage regulator which is enabled or disabled in response to a third control signal, and which converts the DC supply voltage selected by the switch into a third supply voltage when said DC voltage regulator is enabled, said third supply voltage being lower than the selected DC supply voltage;
 a control unit which provides the second control signal to the switch; and
 a loading which utilizes the third DC supply voltage, wherein, while said loading is operating intermittently, said control unit provides to said DC voltage converter the first control signal for disabling said DC voltage converter, provides to said switch the second control signal for selecting the first DC supply voltage, and provides to said DC voltage regulator the third control signal for enabling said DC voltage regulator.

2. An electronic device according to claim 1, wherein, while said loading is operating continuously, said control unit provides to said DC voltage converter the first control signal for enabling said DC voltage converter, provides the second control signal to the switch for selecting the second DC supply voltage, and provides the third control signal to said DC voltage regulator for enabling said DC voltage regulator.

3. An electronic device according to claim 1, further comprising a memory which stores information indicative of whether the present operation state of a load corresponding to an application is an intermittent operation state or a continuous operation state, wherein said control unit determines the second control signal in accordance with the information stored in said memory that indicates the present operation state of the load corresponding to the application which is operating.

4. An electronic device according to claim 2, further comprising a memory which stores information indicative of whether the present operation state of a loading corresponding to an application is an intermittent operation state or a continuous operation state, wherein said control unit determines the second control signal in accordance with the information stored in said memory that indicates the present operation state of the loading corresponding to the application which is operating.

5. An electronic device according to claim 1, further comprising a loading state detector which detects the operation state of the loading, wherein said control unit determines the second control signal in accordance with the present operation state of the loading detected by said loading state detector.

6. An electronic device according to claim 2, further comprising a loading state detector which detects the operation state of the loading, wherein said control unit determines the second control signal in accordance with the present operation state of the loading detected by said loading state detector.

7. An electronic device according to claim 1, further comprising a voltage detector which detects the first DC supply voltage of said DC power source, wherein,
independently of the operation state of the loading, said control unit provides to said switch the second control signal for selecting the first DC supply voltage, when the value of the first DC supply voltage detected by said voltage detector is not higher than a first predetermined threshold value, said first predetermined threshold value being higher by a predetermined value than a predetermined output voltage of said DC voltage regulator.

8. An electronic device according to claim 2, further comprising a voltage detector which detects the first DC supply voltage of said DC power source, wherein,
independently of the operation state of the loading, said control unit provides to said switch the second control signal for selecting the first DC supply voltage, when the value of the first DC supply voltage detected by said voltage detector is not higher than a first predetermined threshold value, said first predetermined threshold value being higher by a predetermined value than a predetermined output voltage of said DC voltage regulator.

9. An electronic device according to claim 3, further comprising a voltage detector which detects the first DC supply voltage of said DC power source, wherein,
independently of the operation state of the load, said control unit provides to said switch the second control signal for selecting the first DC supply voltage, when the value of the first DC supply voltage detected by said voltage detector is not higher than a first predetermined threshold value, said first predetermined threshold value being higher by a predetermined value than a predetermined output voltage of said DC voltage regulator.

10. An electronic device according to claim 5, further comprising a voltage detector which detects the first DC supply voltage of said DC power source, wherein,
independently of the operation state of the loading, said control unit provides to said switch the second control signal for selecting the first DC supply voltage, when the value of the first DC supply voltage detected by said voltage detector is not higher than a first predetermined threshold value, said first predetermined threshold value being higher by a predetermined value than a predetermined output voltage of said DC voltage regulator.

11. An electronic device according to claim 7, wherein said DC voltage converter is a step-up and step-down DC voltage converter, and wherein,
if the value of the first DC supply voltage detected by said voltage detector is lower than said first predetermined threshold value and is not higher than a second threshold value, then said control unit, independently of the operation state of the loading, provides to the DC voltage converter the first control signal for disabling the DC voltage converter, provides to said switch the second control signal for selecting the first DC supply voltage, and provides to said DC voltage regulator the third control signal for enabling said DC voltage regulator, said second threshold value being not higher than a voltage value required by the loading.

12. An electronic device according to claim 1, further comprising a voltage detector which detects the first DC supply voltage of said DC power source, wherein
said DC voltage converter is a step-up and step-down DC voltage converter, and wherein,
if the value of the first DC supply voltage detected by said voltage detector is not higher than a threshold value, then said control unit, independently of the operation state of the loading, provides to said DC voltage converter the first control signal for enabling said DC voltage converter, provides to said switch the second control signal for selecting the second DC supply voltage, and provides to said DC voltage regulator the third control signal for enabling said DC voltage regulator, said threshold value being not higher than a voltage value required by the loading.

13. An electronic device according to claim 2, further comprising a voltage detector which detects the first DC supply voltage of said DC power source, wherein
said DC voltage converter is a step-up and step-down DC voltage converter, and wherein,
if the value of the first DC supply voltage detected by said voltage detector is not higher than a threshold value, then said control unit, independently of the operation state of the loading, provides to said DC voltage converter the first control signal for enabling said DC voltage converter, provides to said switch the second control signal for selecting the second DC supply voltage, and provides to said DC voltage regulator the third control signal for enabling said DC voltage regulator, said threshold value being not higher than a voltage value required by the loading.

14. An electronic device according to claim 3, further comprising a voltage detector which detects the first DC supply voltage of said DC power source, wherein
said DC voltage converter is a step-up and step-down DC voltage converter, and wherein,
if the value of the first DC supply voltage detected by said voltage detector is not higher than a threshold value, then said control unit, independently of the operation state of the loading, provides to said DC voltage converter the first control signal for enabling said DC voltage converter, provides to said switch the second control signal for selecting the second DC supply voltage, and provides to said DC voltage regulator the third control signal for enabling said DC voltage regulator, said threshold value being not higher than a voltage value required by the loading.

15. An electronic device according to claim 5, further comprising a voltage detector which detects the first DC supply voltage of said DC power source, wherein
said DC voltage converter is a step-up and step-down DC voltage converter, and wherein,
if the value of the first DC supply voltage detected by said voltage detector is not higher than a threshold value, then said control unit, independently of the operation state of the loading, provides to said DC voltage converter the first control signal for enabling said DC voltage converter, provides to said switch the second control signal for selecting the second DC supply voltage, and provides to said DC voltage regulator the third control signal for enabling said DC voltage regulator, said threshold value being not higher than a voltage value required by the loading.

16. An electronic device according to claim 1, wherein said DC power source is a rechargeable battery, and the loading is a wireless transceiver, and wherein
said wireless transceiver operates continuously while an application for telephone voice communication or for data communication is operating, and said wireless transceiver operates intermittently while an application for incoming call awaiting operation or for intermittent data transmission is operating.

17. An electronic device according to claim 2, wherein said DC power source is a rechargeable battery, and the loading is a wireless transceiver, and wherein said wireless transceiver operates continuously while an application for telephone voice communication or for data communication is operating, and said wireless transceiver operates intermittently while an application for incoming call awaiting operation or for intermittent data transmission is operating.

18. An electronic device according to claim 3, wherein said DC power source is a rechargeable battery, and the load is a wireless transceiver, and wherein said wireless transceiver operates continuously while an application for telephone voice communication or for data communication is operating, and said wireless transceiver operates intermittently while an application for incoming call awaiting operation or for intermittent data transmission is operating.

19. An electronic device according to claim 5, wherein said DC power source is a rechargeable battery, and the loading is a wireless transceiver, and wherein said wireless transceiver operates continuously while an application for telephone voice communication or for data communication is operating, and said wireless transceiver operates intermittently while an application for incoming call awaiting operation or for intermittent data transmission is operating.

20. An electronic device according to claim 7, wherein said DC power source is a rechargeable battery, and the loading is a wireless transceiver, and wherein said wireless transceiver operates continuously while an application for telephone voice communication or for data communication is operating, and said wireless transceiver operates intermittently while an application for incoming call awaiting operation or for intermittent data transmission is operating.

* * * * *